UNITED STATES PATENT OFFICE.

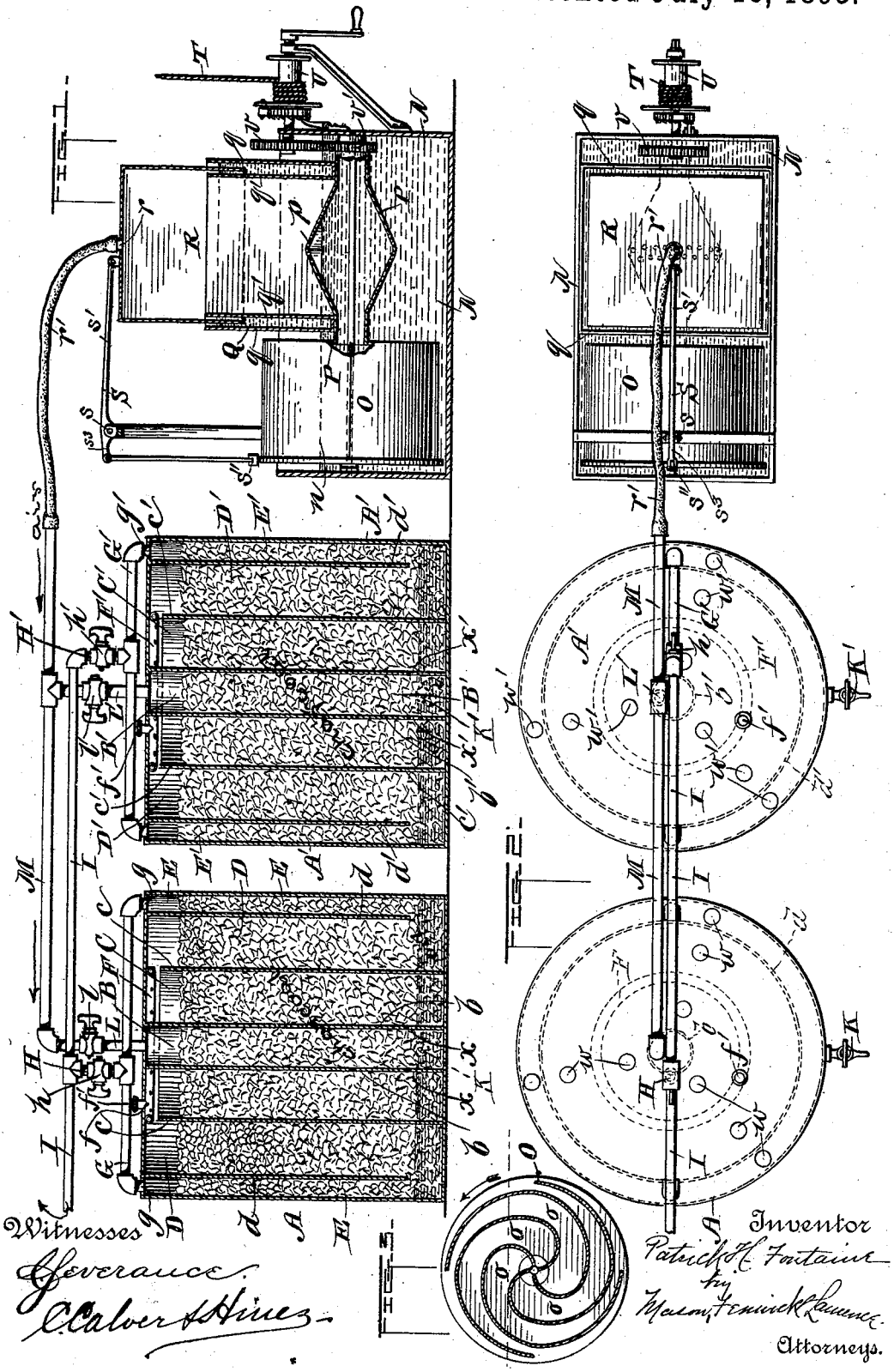

PATRICK H. FONTAINE, OF ELMO, ASSIGNOR OF ONE-HALF TO C. G. HOLLAND AND J. D. BLAIR, EXECUTORS OF ELLEN BLAIR, DECEASED, OF DANVILLE, VIRGINIA.

APPARATUS FOR CARBURETING AIR.

SPECIFICATION forming part of Letters Patent No. 501,778, dated July 18, 1893.

Application filed September 19, 1892. Serial No. 446,291. (No model.)

*To all whom it may concern:*

Be it known that I, PATRICK H. FONTAINE, a citizen of the United States, residing at Elmo, in the county of Halifax and State of Virginia, have invented certain new and useful Improvements in Apparatus for Carbureting Air; and I do hereby declare the following to be a full, clear, and exact description of the invention, such as will enable others skilled in the art to which it appertains to make and use the same.

My invention relates to means for making, illuminating and heating gaseous products, by combining air with the vapor of petroleum; and it consists in a peculiar and novel construction of carburetor chamber or chambers, the said chambers being combined with an air pump. I have ascertained by frequent experiment in making gaseous products from petroleum, that if air is passed through the oil or through charcoal or other absorbent dripping with oil, globules of the oil, or unseparated particles of the oil, are carried off with the air, and these become condensed in the pipe and clog the same; and to avoid this objection is one of the objects of my invention, and to this end I construct and arrange my carburetor chamber or chambers so that the air shall not pass through a collected body of oil at all; nor through charcoal or other absorbent saturated with oil until after the oil has been poured on the charcoal, the charcoal has become thoroughly saturated with it and then time sufficient has been allowed, after the pouring has ceased, for all unvaporized portions of the oil to drain off from the charcoal, and the surface of the charcoal to become dry, and when this has taken place applying the air, which, at this stage, will not, in passing through the saturated charcoal, take off visible globules of oil, but simply become combined with the pure, free vapor of the oil and thus produce a purer gaseous product which is less liable to condense in the pipes and will produce a better light.

In the drawings, Figure 1 represents a transverse, vertical section of my apparatus; Fig. 2 a top plan view of the same, and Fig. 3 a vertical section through the wheel of the air pump.

A A' represent two carburetor vessels of similar construction, and each having, preferably, four compartments, so arranged that the air from the air pump passes down the center or first compartment B, up the second compartment C, down the third compartment D and up the fourth compartment E. The center compartment of carburetor A has the upper edge of its cylinder or boundary riveted and soldered to the top of the carburetor vessel; this cylinder or boundary has its lower edge resting simply on the bottom of the carburetor vessel, and is provided with several holes cut in it above the level of the collected body of drained oil at the bottom of the carburetor vessel; the second compartment has its outer cylinder or boundary $c$ riveted at its lower edge to the bottom of the carburetor vessel but not soldered so as to allow the oil at the bottom of the carburetor vessel to flow from one compartment to another; the third compartment has its outer cylinder or boundary $d$ riveted and soldered to the top of the carburetor vessel, and the fourth compartment E is formed by the wall of the vessel A and the cylinder or boundary $d$ of compartment D, and communication of compartment D with compartment E is allowed below the cylinder or boundary $d$. All of these compartments are filled with an absorbent, preferably, charcoal, nearly to the top. For the designation of similar parts of the fellow carburetor vessel A', to those of vessel A, primed letters of reference, as appear on the drawings, are employed.

F is a circular pipe fastened to the top of the carburetor vessel directly over the cylinder or boundary $c$, and having upwardly bent terminals $f$ closed by a screw cap $f'$. By removal of the cap, oil can be poured into the vessel A. This circular pipe has small holes on each side, arranged so that when oil is poured in at $f'$ it will fall on the charcoal in compartments C and D, and thence drain or trickle down to the bottom of the carburetor vessel. If found desirable, either two, six or more compartments may be provided.

G G' are pipes extending along the tops of carburetor vessels A A', and having their ends $g$ and $g'$ connecting with the outside compartment E and E' of the carburetors A A', each pipe having a T-joint connection for connecting with short pipes H and H'. The pipes H H' have cocks $h$ $h'$, and connect with the pipe I which conveys the gas into the house.

K K' are cocks near bottom of carburetors A A' for drawing off residuum, and for gage cocks to indicate the depth of oil in the bottom of carburetor vessel. The level of the oil in the carburetor vessel should never be higher than these cocks.

L L' are pipes with cocks $l$ $l'$ connecting the center compartments B B' of carburetor vessels A A' with a pipe M, which conveys the air from the air pump to the carburetor vessel or vessels A A'.

N is a trough containing water up to dotted line $n$. O is a wheel with spiral compartments $o$ $o$ connecting with a pipe P which has a considerable enlargement at $p$, with many holes around the larger part of $p$, for the escape of the air into an air holder R, forced by the revolution of wheel O through pipe P.

Q is a water tank with double walls $q$. This tank rests in the trough N just above pipe P. The air holder R works up and down in tank Q and is connected by a collar $r$ to a flexible pipe $r'$ which is connected with pipe M.

S is a lever pivoted at $s$ and having its long arm $s'$ connected to the air holder, and its short arm $s^3$ bearing a connecting rod having a brake $s^2$ on its lower end. When the air holder R reaches its upper limit, it will raise the long arm of lever S, and thereby apply the brake to the wheel O and stop the same. Wheel O is operated by a cord attached to cord T working around the drum U connected with the shaft of wheel O by means of cog wheels $v$ $v'$. While the weight is being wound up the flow of air to the carburetor will be continued by the descent of air-holder R.

W are holes in the top of the carburetors, adapted for putting in charcoal and afterward being closed by soldering.

The advantages of my carburetor lie, first, in its simplicity of construction; second, in the several compartments whereby the air is forced up and down, and caused to pass a greater distance through the oil saturated charcoal; third, in the outer compartment being adapted for being filled with charcoal that is dry (except near the bottom where the oil is taken up by capillary attraction) and the gas thus passing through the dry part of the charcoal in the outer compartment is rendered purer, and fourth, in its general construction adapting it for carrying out my peculiar method of making a gaseous product from petroleum.

The advantages of my air pump consist first, in that it has no ground joints or air tight movable joints; second, the simplicity of the arrangement whereby the air pump is stopped when the gaseous product is not used, and the flow of air is continued while the weight is being wound up.

When it is desired to use the gaseous product only at night, my method requires only one carburetor, which should have the oil poured in at $f'$ at from six to twelve hours before the gas is used. When it is desired to use gaseous product day and night, my method requires two carburetors, one for use during the day and the other for use during the night, and under such use the oil must be poured into the one at morning and into the other at night; or when arranged to be used on alternate days, the oil must be poured into each the day before it is used. It will be readily seen that when cocks $h$ and $l$ are open and cocks $h'$ and $l'$ are closed, the air from the air pump O' is forced through carburetor A, and when cocks $h$ and $l$ are closed and cocks $h'$ and $l'$ are open the air will be forced through the carburetor A'.

What I claim as my invention is—

1. A carbureting vessel having, preferably, four compartments in communication with one another by passages alternately at top and bottom of the vessel, an absorbent, preferably charcoal, in each compartment, a circular pipe perforated on each side, arranged for discharging oil simultaneously on the charcoal in the two principal compartments, a pipe in the central compartment for the inflow of air, and two or more pipes in the outer compartment for the outflow of gas; the outer compartment having charcoal not wet with oil, except such as comes in contact with the oil at the bottom of the vessel; in combination with an air forcing apparatus, substantially as and for the purpose described.

2. In a carbureting apparatus, the combination of a pump, two carbureting vessels, each, preferably, provided with four compartments in communication with one another by passages alternately at top and bottom of a vessel, an absorbent, preferably charcoal, placed in the compartment of each vessel to a height nearly to the top, perforated pipes F F' having upwardly bent terminals $f$ $f$, and caps $f'$ $f'$, pipes G G' connected with the compartments E E' of the two vessels, and having T-shaped coupling-joints, pipes H H' having cocks $h$ $h'$, pipe I, cocks K K' serving for drawing off and gaging the depth of the oil in the vessels, pipe M, pipes L L' having cocks $l$ $l'$ and arranged between the pump O' and the vessels A A', whereby one of the carburetors can be in use while the other is being prepared for use, and thus the carbureting vessels alternately brought into operation, substantially as described.

In testimony whereof I hereunto affix my signature in presence of two witnesses.

PATRICK H. FONTAINE.

Witnesses:
E. T. FENWICK,
C. CALVERT HINES.